(No Model.)

H. F. DE B. CAMERON & T. HARRIS.
SECONDARY BATTERY.

No. 404,168. Patented May 28, 1889.

WITNESSES
John E. Wiles.
Th. B. O'Dogherty

INVENTOR
Henry F. de Bathe Cameron
Thomas Harris
By W. W. Leggett
Attorney

UNITED STATES PATENT OFFICE.

HENRY F. DE BATHE CAMERON AND THOMAS HARRIS, OF DETROIT, MICHIGAN, ASSIGNORS OF ONE-THIRD TO ALFRED WOODWARD, OF SAME PLACE.

SECONDARY BATTERY.

SPECIFICATION forming part of Letters Patent No. 404,168, dated May 28, 1889.

Application filed February 29, 1888. Serial No. 265,760. (No model.)

*To all whom it may concern:*

Be it known that we, HENRY F. DE BATHE CAMERON and THOMAS HARRIS, subjects of the Queen of Great Britain, residing at Detroit, county of Wayne, State of Michigan, have invented a certain new and useful Improvement in Storage-Batteries; and we declare the following to be a full, clear, and exact description of the invention, such as will enable others skilled in the art to which it appertains to make and use the same, reference being had to the accompanying drawings, which form a part of this specification.

Our invention consists of the combinations of devices and appliances hereinafter specified, and more particularly pointed out in the claims.

Figure 1:
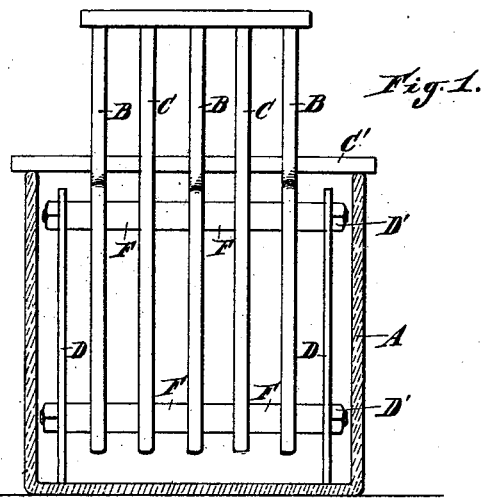
Figures 2, 3:
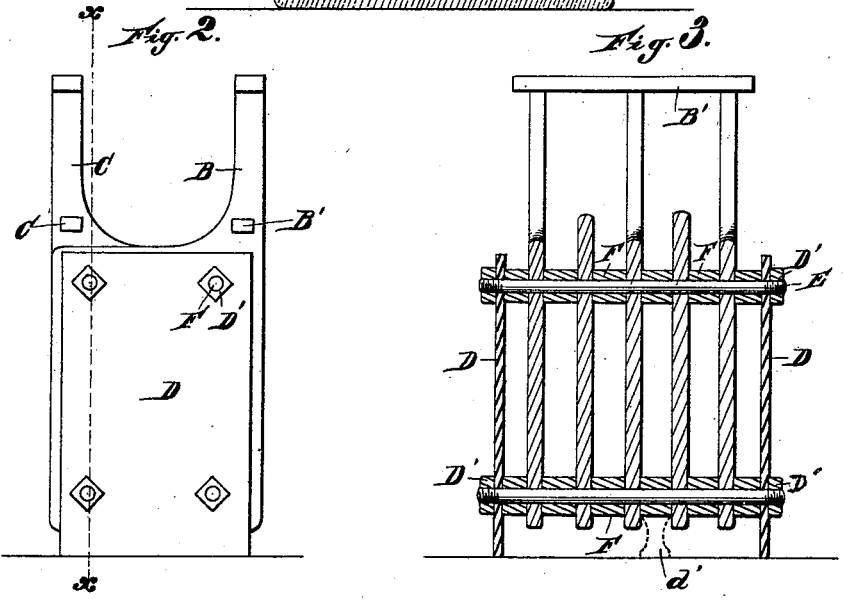
Figure 4:
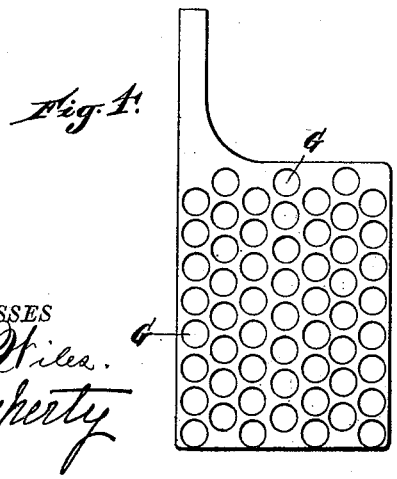
Figure 5:
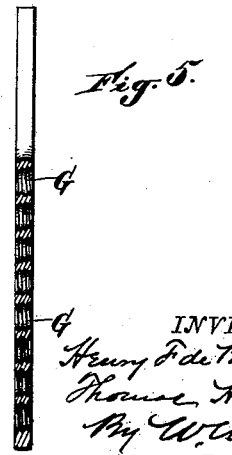

In the drawings, Figure 1 is a view in front elevation, and Fig. 2 a view in side elevation, of a storage-battery cell embodying our invention. Fig. 3 is a sectional view in a vertical plane passed through one of the sets of bolts and washers by which the plates are fastened together. Fig. 4 is a view in elevation, and Fig. 5 a sectional view, of one of the separate elements.

Our invention relates more particularly, first, to a novel construction of a storage-battery element or plate, the same being punctured with circular orifices, each said orifice being threaded so as to engage and hold the salt of lead, which in the form of paste is placed therein; second, in the arrangement of a series of plates side by side separated by soft rubber or other equivalent non-conducting material, and with a bolt, of hard rubber, vitreous fiber, or other non-conducting material, passed through the plates and washers and the whole bound together by a nut of similar material run upon the end of the said bolt or bolts; third, in supporting the said plates or elements by glass, rubber, or other non-conducting plates at the two sides; fourth, in projecting said glass supports a distance below the plates or elements, so as to hold them up above the bottom of the cell, in order that sediment or lead dropping to the bottom of the cell may not bridge over and so form a connection between the plates at their lower edges; also in other novel features of construction.

In carrying out our invention, A represents an ordinary cell of a storage-battery, said cell preferably made of glass, so as to expose to view the condition of the interior of the cell.

B represents the positive and C the negative plates, usually of lead.

D represents supporting-plates, of glass, rubber, or other non-conducting material.

E represents bolts, of hard rubber, vitreous fiber, or other non-conducting material, and D' represents corresponding nuts.

F represents washers, preferably of soft rubber, although they may be of any other non-conducting material. These washers are interposed between the plates, and the bolts E passed through the plates and washers and sustain the plates between the glass supports D. There may be any number of these bolts E, nuts D', and the corresponding washers. The requisite number depend upon the size of the battery plates or elements. These bolts and nuts are designed to firmly bind the battery plates or elements together and maintain them flat and uniform and to prevent their warping out of shape, whereby contacts are liable to ensue between them. The supports D are continued down below the lower edges of the plates, so that when adjusted within the cell the plates are held up well above the bottom of the cell, leaving a free space beneath the plates. The object of this arrangement is to prevent connections being made between the positive and negative plates or elements by sediment or salts of lead that may be precipitated to the bottom of the cell. Each of these plates or elements B and C is perforated throughout with round holes G for the reception of the salt of lead. These holes are each tapped with a threading-die, so as to form a thread therein. This thread engages the lead paste and prevents its displacement. This construction is at once very simple, and the screw-thread forms the most ready and inexpensive engagement to prevent displacement of the lead paste. The lead paste is applied in any usual manner. Thus, for instance, peroxide of lead may be mixed in the usual manner into the form of a paste, and in this condition inserted within the said threaded orifices, the whole being then subjected to pressure. The paste is consolidated and compressed into the screw-threads, thus fixing it firmly in place.

B' and C' represent supporting-bars which extend across the tops of the positive and negative elements, respectively, and support the same, so as to take the weight from the bolts. These bars may or may not be employed, and instead of employing the bars one or more of the plates may themselves be extended down to and rest upon the bottom of the cell. Where such plates are extended to the bottom of the cell, we prefer to extend those which belong to the same system—that is, either positive or negative plates, but not both—so that injury might not result through their connection by metal or sediment at the bottom of the cell.

We would have it understood that not only the supporting-bars B' C', but the downward-projecting plates, may be dispensed with and reliance had solely upon the bolts E to support the said elements. A battery made in this way is exceedingly durable. The salts of lead are very firmly held and retained within the orifices in the plates. The plates themselves are well guarded against warping. They are also thoroughly guarded against contact at the base, and the plates being suspended well above the bottom, and the whole located within glass cells, the condition of the battery is at all times apparent at a glance.

Instead of projecting one or more of the battery-elements to the bottom of the cell for the purpose of supporting the remaining elements, one or more of the washers might be extended downward, so as to form a leg or support resting upon the bottom of the cell, and so accomplish the same purpose. Such a support is shown at $d'$.

What we claim is—

1. A storage-battery consisting of alternate positive and negative plates supported free from the bottom of the cell by supports of non-conducting material, washers of non-conducting material interposed between said plates, bolts of non-conducting material passed through the plates and washers, and the plates and washers bound firmly together by nuts D', whereby warping and derangement of the plates and washers are prevented, substantially as described.

2. A storage-battery element consisting of a lead plate perforated with round holes for the reception of the salts of lead, said holes screw-threaded, thereby affording firm engagement for the said salts, substantially as and for the purposes described.

3. The combination, with the elements B and C, of one or more supports, $d'$, of non-conducting material, said support at its upper end projecting between the elements and constituting a washer, and in connection therewith a supporting-bolt of non-conducting material passed through the plates and washer, whereby the whole are bound together and to said washer, substantially as and for the purpose described.

In testimony whereof we sign this specification in the presence of two witnesses.

HENRY F. DE BATHE CAMERON.
THOMAS HARRIS.

Witnesses:
M. B. O'DOGHERTY,
SAMUEL E. THOMAS.